J. A. TURNER.
SUPPLEMENTAL SEAT ATTACHMENT FOR BICYCLES.
APPLICATION FILED JULY 24, 1911. RENEWED SEPT. 16, 1912.
1,045,220.
Patented Nov. 26, 1912.
2 SHEETS—SHEET 1.
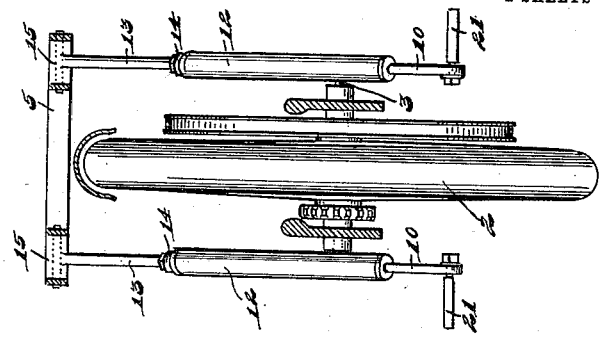
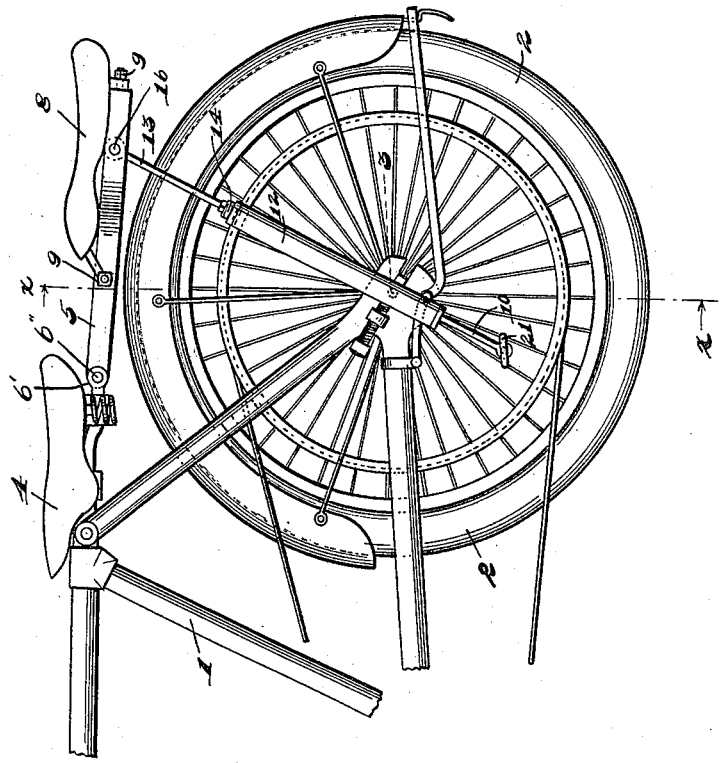
Witnesses:
C. E. Wessels.
A. A. Olson
Inventor:
James A. Turner,
By Joshua R. H. Potts
his Attorney.

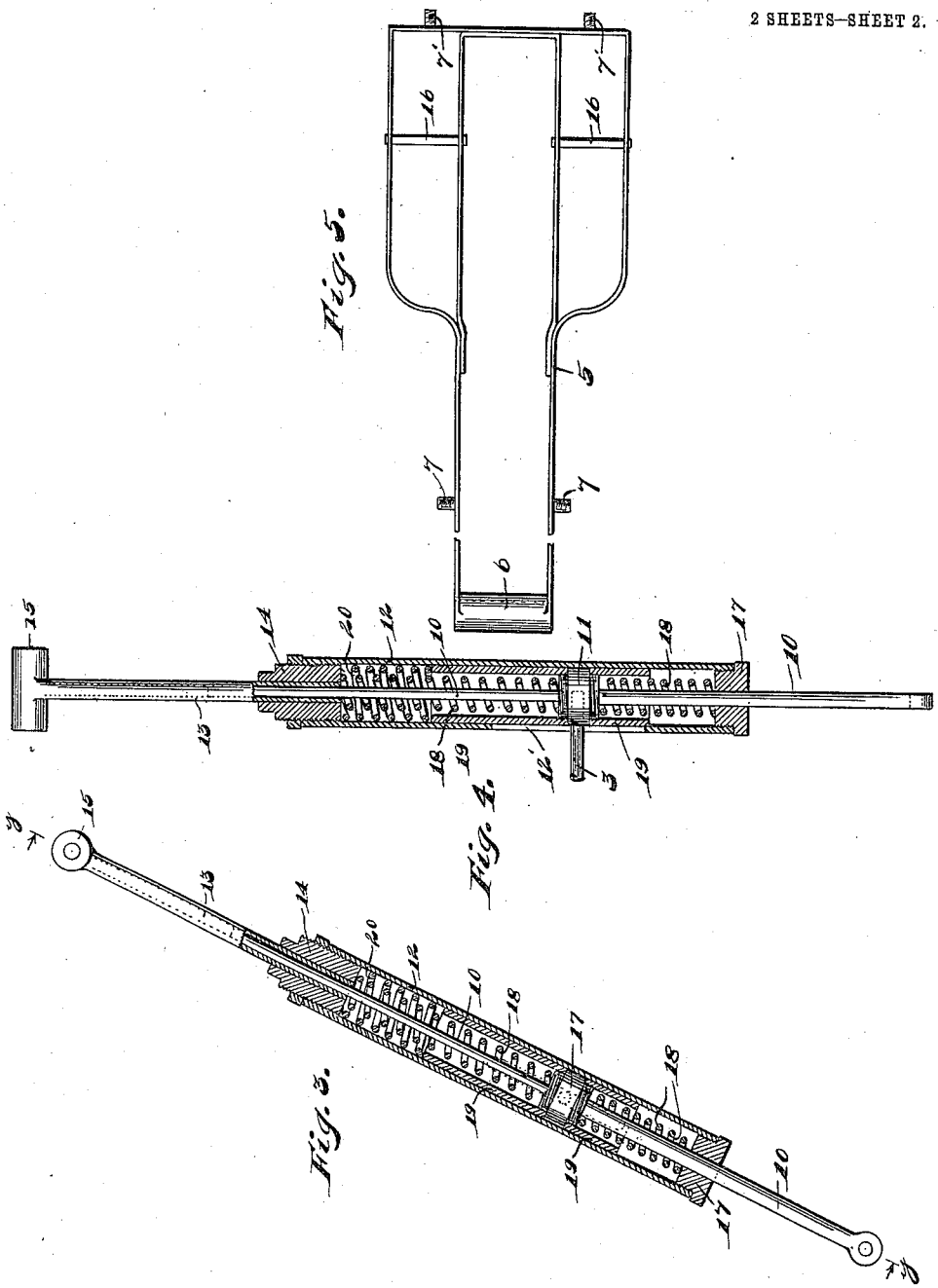

UNITED STATES PATENT OFFICE.

JAMES A. TURNER, OF CHICAGO, ILLINOIS.

SUPPLEMENTAL SEAT ATTACHMENT FOR BICYCLES.

1,045,220.  Specification of Letters Patent.  Patented Nov. 26, 1912.

Application filed July 24, 1911, Serial No. 640,163. Renewed September 16, 1912. Serial No. 720,674.

*To all whom it may concern:*

Be it known that I, JAMES A. TURNER, a citizen of the United States, and a resident of the city of Chicago, county of Cook, and State of Illinois, have invented certain new and useful Improvements in Supplemental Seat Attachments for Bicycles, of which the following is a specification.

My invention relates to improvements in tandem attachments for cycles and more particularly to a supplemental seat attachment adapted for use upon a motor cycle.

The object of my invention is the production of a seat attachment of the character mentioned which may be readily and quickly applied to a cycle and which when arranged for use will be adapted to efficiently serve the purpose for which it is designed.

A further object is the production of an attachment as mentioned, which will be of simple and economical construction, hence one which may be manufactured at a low cost.

Other objects will appear hereinafter.

With these objects in view my invention consists in the combinations and arrangements of parts hereinafter described and claimed.

My invention will be best understood by reference to the accompanying drawings forming a part of this specification, and in which, Figure 1 is a side elevation of the rear end portion of a motor cycle to which is applied a supplemental seat attachment embodying my invention, Fig. 2 is a section taken on substantially line $x$—$x$ of Fig. 1, Fig. 3 is an enlarged central longitudinal section of one of the supporting members for the rear end of the tandem seat frame detached, Fig. 4 is a section taken on line $y$—$y$ of Fig. 3, and Fig. 5 is a top plan view of the tandem seat supporting frame detached.

Referring now to the drawings I have shown therein a motor cycle of ordinary construction, 1 designating the frame thereof and 2 the rear wheel which is supported upon the rear axle 3, 4 indicating the saddle of the cycle which is mounted in the usual manner upon the frame 1. The preferred form of the construction forming the subject matter of this invention and which is applied to the motor cycle comprises the tandem seat supporting frame 5. Said frame 5 is constructed as clearly shown in Fig. 5 preferably of band or strapped metal, the forward end thereof being provided with a transversely extending opening or tubular portion 6 which is adapted to fit between the eyes 6′ provided at the rearward end of the frame or saddle 4 and be pivotally secured thereto by means of a pin 6″. The central portion of the frame 5 as will be observed is formed with a longitudinal opening which provides clearance for the rear wheel of the cycle or the mud guard thereof as the case may be. Provided adjacent the forward end of said frame 5 are laterally projecting studs 7 and provided at the rearward end of said frame are rearwardly projecting studs 7′, said studs affording means for attachment of the tandem saddle 8, nuts 9 being threaded upon the outer ends of said studs to rigidly secure the saddle 8 in position.

The rearward end of the frame 5 is resiliently supported through the medium of two elongated supporting members which depend therefrom upon either side of the wheel 2. Each of said supporting members comprises an elongated rod 10 having a centrally enlarged cylindrical portion 11 which is tapped for connection with the adjacent terminal of the rear axle 3 as clearly shown in Fig. 4. Slidably mounted upon each of the rods 10 is a tube 12, the inner diameter of said tube being such as to snugly receive the enlarged portion 11 of the rod 10 coöperating therewith. The inner sides of the tubes 12 are provided with elongated longitudinal slots 12′ which afford clearance for the axle terminals so as to permit of longitudinal sliding of said tubes. The upper end portion 13 of each of the tubes 12 is reduced, said reduced portion 13 being connected with the portion 12 through the medium of a screw plug 14, the lower end of portion 13 being rigidly secured in said plug as by shrinking. The upper end portions of the plugs 14 are squared or polygonally formed so that the same may be engaged by a monkey wrench for turning. The tube members 13 snugly receive the upper ends of the rods 10 serving as guides therefor, the upper end portions of said tube members being provided with transversely extending tubular portions 15 which afford means for additional attachment to the seat frame 5, through the medium of the pins 16 which are adapted to pass through said portions 15, The lower ends of the tubes 12 are closed by screw plug 17, the latter evidently serving as bearings for the lower ends of the rods 10 to maintain the same in axial positions in said tubes. Arranged in each of the tubes 12 are springs 18 interposed between the enlargement 11 of the rod 10 thereof and the plugs 14 and 17. Said springs evidently serve to resiliently maintain the tubes 12 in medial positions upon the rods 10 and to resiliently support the rearward end of the seat frame 5, it being clear that downward pressure upon the rearward end of the seat frame 5 will be counteracted by the upper springs 18 and upward movement of said seat frame by the lower of said springs, thus resiliently supporting said seat frame and hence the saddle carried thereby. Carried by the enlargement 11 of each of the rods 10 are tubular extensions or sleeves 19, one of which extends upwardly and the other downwardly from said enlargement, said extensions serving to close the slot 12' adjacent thereto preventing the entry of dust or dirt within the tube 12. Springs 20 are preferably interposed between the upper ends of the uppermost of the tubes or sleeves 19 and the plugs 14 to serve as additional means for resiliently supporting the tandem saddle and more particularly as a means of absorbing shocks in the event of the upper springs 18 being overtaxed by reason of the excessive roughness of the road traveled over.

Provided at the lower extremities of the rods 10 are foot rests 21, said foot rests being of any preferred construction and secured to said rods in any suitable manner.

A supplemental seat attachment of the construction set forth is durable and economical. Through the medium of the plug 14 the tension of the springs within the tubes 12 may be readily adjusted as desired to suit conditions, such adjustment being effected simply by turning said plugs farther into the tubes 12 or in an opposite direction to position the same higher in said tubes. Also through the medium of said plugs vertical adjustment of the saddle 8 may be regulated as will be described. The foot rests 21 with the construction set forth are rigidly arranged, that is, the same, through the medium of the rods 10 are rigidly connected with the axle 3, a firm foot rest for the occupant of the tandem seat being thereby afforded, which is of great advantage as will be understood by those familiar with construction of this character. By forming the seat supporting members with stationary rods and slidable tubes mounted upon and inclosing the upper ends of said rods, the possibility of dirt or other foreign matter finding its way to the interior of the tubes to interfere with the free operation of the parts, is obviated. The only exposed joints with this construction, are at the lower extremities of the tubes where the rods project exteriorly. But these joints open downwardly and hence no dirt or foreign matter will enter the same. Also with this construction the upper ends of the supporting members may readily be kept clean so that the clothing of the occupant of the supplemental seat contacting therewith will not be soiled as would be the case were the upper ends of the rods and hence their oily or greasy bearing surfaces exposed. The tandem saddle supporting frame is also simple and durable of construction and the connection thereof with the cycle seat is of extreme simplicity although highly efficient.

While I have illustrated and described the preferred form of construction for carrying my invention into effect, this is capable of variation or modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a cycle having a rear axle and a seat, of a tandem attachment therefor comprising a seat support, a connection between the forward end of said seat support and said cycle seat; means supporting the rearward end of said seat support, said means comprising two rods connected intermediate their ends with the respective extremities of said axle; tubes slidably mounted upon and inclosing the upper end portions of said rods and connected at their upper ends with the rearward end of said seat support, the inner sides of said tubes being provided with longitudinal slots to afford clearance for said axle ends, there being opposing shoulders provided upon said rods and in said tubes; and compression springs arranged in said tubes and interposed between said shoulders for resiliently supporting said tubes, substantially as described.

2. The combination with a cycle having a rear axle and a seat, of a tandem attachment therefor comprising a seat support, a connection between the forward end of said seat support and said cycle seat; means supporting the rearward end of said seat support, said means comprising two rods connected intermediate their ends with the respective extremities of said axle; tubes slidably mounted upon the upper end portions of said rods and connected at their upper ends with the rearward end of said seat support, the inner sides of said tubes being provided with longitudinal slots to afford clearance for said axle ends, there being opposing shoulders provided upon said rods and in said tubes; compression springs arranged in said tubes and interposed between said shoulders for resiliently supporting said tubes; and foot rests provided at the lower ends of said rods, substantially as described.

3. The combination with a cycle having a rear axle and a seat, of a tandem attachment therefor comprising a seat support, a connection between the forward end of said seat support and said cycle seat; means supporting the rearward end of said seat support, said means comprising two rods connected intermediate their ends with the respective extremities of said axle; tubes slidably mounted upon the upper end portions of said rods and connected at their upper ends with the rearward end of said seat support, the inner sides of said tubes being provided with longitudinal slots to afford clearance for said axle ends, shoulders provided upon said rods, the upper ends of said tubes being reduced, plugs connecting said reduced portions of said tubes with the bodies thereof, plugs at the lower ends of said tubes; and springs interposed between said shoulders and said plugs for resiliently supporting said tubes, substantially as described.

4. The combination with a cycle having a rear axle and a seat, of a tandem attachment therefor comprising a seat support, a connection between the forward end of said seat support and said cycle seat; means supporting the rearward end of said seat support, said means comprising two rods connected intermediate their ends with the respective extremities of said axle; tubes slidably mounted upon the upper end portions of said rods and connected at their upper ends with the rearward end of said seat support, the inner sides of said tubes being provided with longitudinal slots to afford clearance for said axle ends, shoulders provided upon said rods, the upper ends of said tubes being reduced; screw plugs connecting said reduced portions with the bodies of said tubes, screw plugs at the lower ends of said tubes; springs interposed between said shoulders and said plugs for resiliently supporting said tubes; and foot rests at the lower ends of said rods, substantially as described.

5. The combination with a cycle having a rear axle and a seat, of a tandem attachment therefor comprising a seat support, a connection between the forward end of said seat support and said cycle seat; means supporting the rearward end of said seat support, said means comprising two rods connected intermediate their ends with the respective extremities of said axle; tubes slidably mounted upon the upper end portions of said rods and connected at their upper ends with the rearward end of said seat support, the inner sides of said tubes being provided with longitudinal slots to afford clearance for said axle ends; sleeves on said rods for closing said slots; springs for resiliently supporting said tubes on said rods; and foot rests at the lower ends of said rods, substantially as described.

In testimony whereof I have signed my name to this specification in the presence of two subscribing witnesses.

JAMES A. TURNER.

Witnesses:
JOSHUA R. H. POTTS,
W. C. SMITH.

---

Copies of this patent may be obtained for five cents each, by addressing the "Commissioner of Patents, Washington, D. C."